Oct. 7, 1958 J. R. ERICKSON Re. 24,548

CUT-OFF WHEEL

Original Filed June 7, 1956

INVENTOR
JOHN R. ERICKSON
BY
ATTORNEY

United States Patent Office

Re. 24,548
Reissued Oct. 7, 1958

24,548

CUT-OFF WHEEL

John R. Erickson, Worcester, Mass., assignor to Norton Company, Worcester, Mass., a corporation of Massachusetts Original No. 2,814,918, dated December 3, 1957, Serial No. 589,916, June 7, 1956. Application for reissue May 22, 1958, Serial No. 738,252

8 Claims. (Cl. 51—206)

Matter enclosed in heavy brackets [ ] appears in the original patent but forms no part of this reissue specification; matter printed in italics indicates the additions made by reissue.

The invention relates to cut-off wheels.

One object of the invention is to provide a cut-off wheel, for cutting off lengths of rod, bar, or pipe of iron or steel or other metal, the wheel having great strength. Another object of the invention is to provide a cut-off wheel of great strength yielding only moderate wheel wear. Another object is to provide a cut-off wheel which will cut materials rapidly, exhibiting less wheel wear than the best competitive wheels and which is far stronger than such wheels, being especially resistant to side blows. Another object of the invention is to provide a cut-off wheel which is considerably safer to use than those previously on the market.

Another object of the invention is to provide a superior wheel of the characteristics mentioned for sharpening meat saws. Another object is to provide a strong and free cutting wheel for slotting, which often places considerable strain upon the wheels.

Other objects will be in part obvious or in part pointed out hereinafter.

Figure 1:
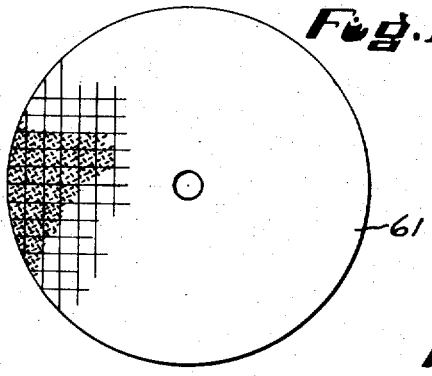
Figure 2:
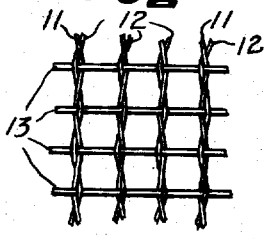
Figure 3:
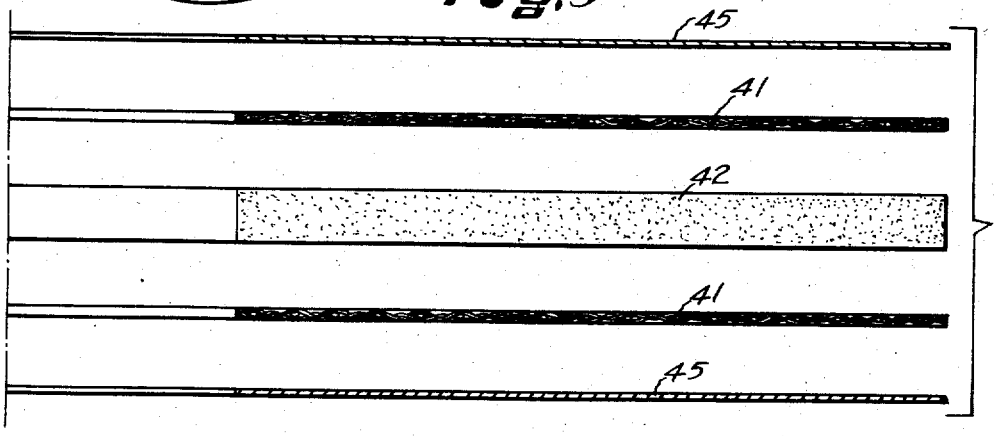
Figure 4:
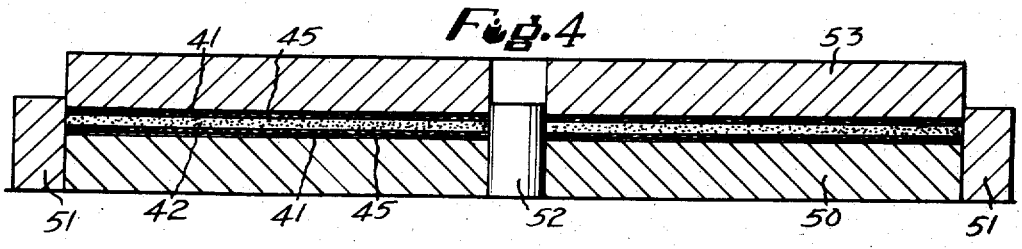
Figure 5:
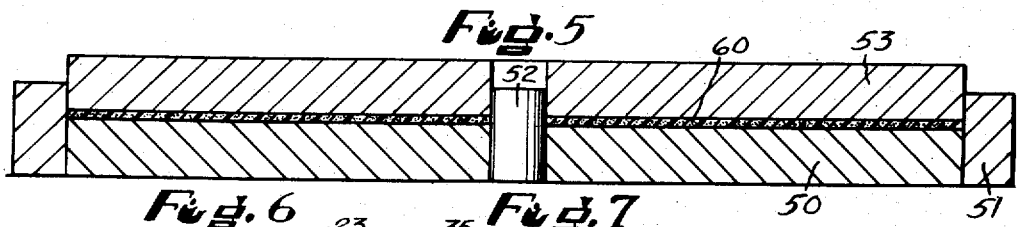

In the accompanying drawings illustrating my cut-off wheel, the components thereof and the molding operation for its manufacture, Fig. 1 is a side elevation of the cut-off wheel, Fig. 2 is a plan view of glass cloth of leno weave for use in this invention, Fig. 3 is a sectional view of the components for the manufacture of the wheel, Fig. 4 shows a mold loaded with the components before pressing, Fig. 5 shows the mold in section after it is closed and the wheel components have been pressed.

Figure 6:
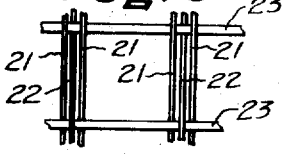
Figure 7:
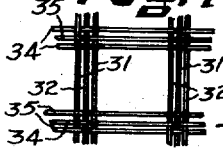

Figs. 6 and 7 are plan views of glass cloth of non-leno weave which can be used in this invention.

Referring now to Fig. 2, I provide a quantity of leno weave glass cloth. By glass cloth I mean that the warp and weft are glass yarn. This yarn is continuous filament yarn in order that it shall have great strength.

Leno weave is a proper technical term and in the leno weave the warp is divided into dupe threads 11 and cross threads 12. Actually these are indistinguishable in the cloth but quite distinguishable in the loom.

It will be seen that the dupe threads 11 and cross threads 12 are twisted around the weft threads 13. Each pair of [dupe thread and a cross thread constitutes a warp end unit.] *threads consisting of one dupe thread and one cross thread constitutes a warp end unit as shown in Figure 2.* It will be seen that each warp end unit has its dupe and cross threads 11 and 12 twisted around the weft threads 13 referred to by mill men as the filling. The filling is that which is shot through the warp shed by the shuttle.

In ordinary weaving the warp is upheld by the heddles of two or more harness frames, and at each pick at least one frame is down and one is up and thus the shed is formed. A pick is another synonym for weft thread and is also the act of throwing the shuttle. In ordinary weaving the warp and weft are merely interlaced without the warp being twisted around the weft as in leno weaving. In leno weaving every shed is formed with the dupe threads up and the cross threads down, or vice versa. The special harness frames, loom motions, and heddles in a leno loom at the time the new shed is being formed lift the cross thread up over the dupe thread and down the other side, or vice versa.

It will be seen that an open weave fabric is made by leno weaving in which the warp and weft are secured together so that the openings remain fixed. In cheese cloth, which is an open mesh fabric with a plain weave the slightest disturbance moves the weft along the warp or the warp along the weft making some openings smaller and some openings larger. Consequently this type of cloth, namely cheese cloth, which is cotton cloth, or any similar cloth made out of other yarn, is unsuited for manufacturing operations where it is desired that the openings remain fixed during manipulation for manufacturing, as is desired in the present case.

But there are other weaves which will achieve the same result, at least to a large degree. In such other weaves there are a plurality of warp ends to each warp end unit thus partially to interlock the weft even though a non-leno weave is used. It is better in the case of using non-leno weave to have at least three warp ends per unit. To make a balanced open mesh cloth the individual threads of each warp end unit should have the weight of a weft thread divided by the number of ends to the warp end unit. In non-leno weaves each individual warp thread is usually referred to as a warp end. For all practical purposes, I prefer the leno weave with each warp end unit constituting one dupe thread and one cross thread, each dupe thread and each cross thread having half the weight per length of a weft thread, all of the dupe threads and warp threads being uniform. This, in glass cloth, makes a strong open mesh fabric and the warp holds the weft tightly enough for purposes of manufacture.

Fig. 6 illustrates such a non-leno weave where each warp end unit is made up of three warp ends 21, 21 and 22 interlacing the filling 23. The harness frames move the ends 21 and the ends 22 before each pick and when the ends 21 are down the ends 22 are up and vice versa. This produces a fairly tight [interlacking] *interlocking*. The reed and the take-up control the spacing of the warp and weft as is usual.

But another weave which can be used is illustrated in Fig. 7. In this weave the warp ends 31 and 32 are in spaced warp end units as shown, and the filling is in spaced weft units as shown. The filling is shown as picks 34 and 35. The warp ends 31 are carried by one harness frame, and the warp ends 32 are carried by another harness frame moving oppositely. This produces the weave and a plain loom with an irregular takeup can be used which will space the weft as shown. In such a loom cams operate the harness frames and therefore there will be a change of the shed between the flight of the shuttle for the last pick of one weft unit and the flight of the shuttle for the first pick of the next weft unit. Preferably in such a weave all warp and all filling is of the same weight per unit length. Many other weaves with warp and/or weft in units can be used.

Referring now to Fig. 3 in the manufacture of each cut-off wheel two discs 41 of the glass cloth are provided. These are defined as discs of open mesh glass cloth of continuous filament glass yarn, with one at least of the warp and weft in spaced units each unit having at least two threads, said glass cloth having from two and one half to seven openings per inch in the direction of the warp and in the direction of the weft.

I provide further an abrasive resinoid mix for the manufacture of my cut-off wheel. The resinoid is the bond and for most wheels I prefer phenolic resin, but rubber also makes a good bond. Cut-off wheels of my invention have been embodied in rubbed bonded cut-off wheels.

In the illustrative embodiment of the invention, the discs 41 were glass cloth discs of leno-weave as shown in Fig. 2 having five openings to the inch in each direction. The warp yarn was 150 3/2, the weft yarn also called filling was 150 3/4. There were six ends of 150's fiber per warp end and twelve ends of 150's fiber per filling [end. The warp strength was about 200 lbs. per warp end unit and that means both the dupe thread and the cross thread. The strength of each would be be about 100 lbs.]. *The warp tensile strength and the weft tensile strength were each of them about 200 lbs. per inch width of fabric. This warp tensile strength and this weft tensile strength of this glass fabric should be at least 100 lbs. tensile strength per inch width.* This completes the description of the illustrative embodiment. [The strength of the warp unit and the weft unit in this invention should be at least 100 lbs. tensile strength.]

The abrasive may be any suitable abrasive but in the illustrative embodiment was 60 grit size fused alumina regular grade by which those skilled in this art know I mean fused from calcined bauxite in an elestric furnace with coke as a reducing agent and iron borings to unite with the released silicon to form the button. Other types of aluminum oxides can be used as the pure white variety and that type which is formed in discrete crystals. Silicon carbide of any variety can be used.

The preferred organic bond and the one used was phenol-formaldehyde resinoid of the brand BR–11980. The complete abrasive bond combination was as shown in the following table:

TABLE I

| Material | Weight, Pounds |
|---|---|
| 60 grit size regular fused alumina | 7.00 |
| BR–11980 "Bakelite" phenolic resin | 1.35 |
| Iron pyrites to promote grinding | 1.45 |
| Lime, CaO, to take up water and prevent swelling | .20 |
| Total | 10.00 |

In addition to the above the abrasive was also wetted with 88 cc. furfural and after mixing with 40 cc. "Carbosota" brand anthracene oil. The mixing was done in the conventional way by first wetting the abrasive with the furfural, then adding the resin, the pyrites, and the lime, and finally, after thorough mixing, adding the anthracene oil.

I also provided two sheets of black paper 45 known as technical paper 69. This is a thin wood pulp paper of about the consistency of tissue paper. Ordinary tissue paper would do, but I prefer that the paper should be black so the wheel will not look spotted.

Referring now to Fig. 4 for the manufacture of a wheel nine inches in diameter, 80 thousandths of an inch thick with a five-eighths inch central hole, I provided a steel bottom plate 50, a steel mold band 51, a central steel arbor 52, and a steel top plate 53. The bottom plate 50, the mold band 51, and the arbor 52 were placed upon a turntable. Before this turntable was started, one disc 45 of the technical paper cut to the size and shape of the eventual wheel was placed upon the plate 50. Then a disc 41 of the glass cloth described was placed on top of the paper. Then the turntable was started and 177 grams of the above described phenolic resin mix was added and spread level. Next the other disc 41 of glass cloth was added, and then the other sheet 45 of technical paper was laid on top, the turntable having been stopped before these additions. To keep the wheel from warping, it is desirable that the warp of one disc 41 be parallel to the warp or weft of the other disc 41. Finally, the top plate 53 was placed in position as shown in Fig. 4.

Then the assembly shown in Fig. 4 was taken to a press and pressed at 70 tons total pressure. Fig. 5 shows the mold closed with the "green" wheel 60 in it. The wheel 60 was then stripped from the mold, the mold being the parts 50, 51, 52, and 53. It is desirable that wheels according to the invention have rough sides as this improves the grinding performance. Rough sides were given to the wheel described by pressing the green, that is uncured wheels, between number 20 mesh wire screens. A number of wheels were made at one time and a stack of wire screen, green wheel, wire screen, steel plate, wire screen, green wheel, wire screen, steel plate, etc., was built up and this assembly was put into a press and pressed with a total pressure of 140 tons.

Next this entire assembly was clamped with a spring plate on top exerting 900 lbs. pressure. The wheels were then taken to an oven and baked at the usual cycle involving a top temperature of 175° C. This completed manufacture of these wheels in the illustrative embodiment of the invention. Fig. 1 shows a completed cured wheel 61.

The glass cloth above described was given a starch finish by the manufacturer. For making wheels by the cold pressing technique using open mesh cloth as described I have found that it is important to add a phenolic resin varnish or the equivalent as otherwise the glass yarn is crushed during the pressing operation and loses part of its strength. Consequently for the manufacture of the wheels described, the glass cloth 41 was impregnated with 30% by weight of phenolic resin varnish, BV–17085 Bakelite. This is phenol formaldehyde. By 30% I mean that 30% of the piece of glass cloth after it has been dried to a volatile of approximately 3%, which was done, that 30% of the cloth is this varnish and 70% of the cloth is glass yarn. The impregnation should be from 15% to 50% of the glass cloth, the remainder should be glass yarn. The starch weighs little, about 2% to 3% of the glass cloth, and in the above is calculated as glass yarn.

The wheels made as above described were tested against standard abrasive web filled wheels which have been regularly used in industry as cut-off wheels. The results were as shown in the following table:

TABLE II

| Wheels | Breaking Speed, Centrifugal Test | Impact Test, Foot Pounds | Olsen Test, Pounds |
|---|---|---|---|
| Invention | 31,334 | 1.3 | 603 |
| Abrasive Web | 27,000 | .5 | 313 |

The wheels entitled "invention" in Table II were wheels made as above described according to the preferred form of the invention. The "abrasive web" wheels with which they were compared, were standard cut-off wheels made out of carded cotton filled with abrasive and impregnated with phenolic resin. The bond was therefore phenol-formaldehyde. Such wheels are now made in great quantities in the United States and sold all over the world. They were of exactly the same size as the "invention" wheels, being nine inches in diameter and very close to .080" in thickness, with the same central hole of five-eighths of an inch.

The breaking speed is given in surface feet per minute. It is well known that even for wheels of different diameter, if the central hole is small, the breaking speed in surface feet per minute is about the same for a given material. However, these wheels were all of the same size. It is further clear from the laws of physics that slight variations in thickness will make no difference in the breaking speed in the centrifugal test.

The impact test was made on a standard pendulum machine on rectangular strips of the material of the wheels measuring 4" x ¾ of an inch. A foot pound is a unit of work which measures the impact of the pendulum on the strip. It is calculated by the weight of the pendulum mass times the difference between the height at release and the height to which the mass rises after breaking through the strip. This is a standard test.

The Olsen test is made on a standard Olsen machine. The wheels were mounted on rings holding the periphery and pressed by center rings four and one-half inches in diameter. The respective wheels broke at the applied force given in pounds.

The centrifugal test shows the invention wheels to [be 14.3 percent stronger] *have 16 percent greater speed at breakage* than the abrasive web wheels. The impact test shows the invention wheels to be 160 percent stronger than the abrasive web wheels. The Olsen test shows the invention wheels to be 93 percent stronger than the abrasive web wheels. There is nothing inconsistent in these figures as the tests are for different kinds of strength.

The wheels of the invention were also tested for grinding against the same abrasive web wheels which also were made out of 60 grid size regular fused alumina abrasive. In the test of Table III they were tested cutting off one-half inch diameter cold rolled steel. In the test of Table IV they were tested cutting off three-fourths inch diameter cold rolled steel. The first column identifies the wheel as in Table II. The second column gives wheel wear of the wheel on the diameter by the legend Dia. WW. The third column gives the number of cuts taken. The fourth column comments upon the burn of the work and the burr.

TABLE III

| Wheels | Dia. WW, inches | No. Cuts | Comments |
|---|---|---|---|
| Invention | .17 | 15 | Same amount of burn for both wheels. "Invention" wheels showed slightly less burr. |
| Abrasive Web | .31 | 15 | |

TABLE IV

| Wheels | Dia. WW, inches | No. Cuts | Comments |
|---|---|---|---|
| Invention | .25 | 5 | Same as in Table III. |
| Abrasive Web | .32 | 5 | |

Seven inch diameter wheels according to the invention and made out of 36 grit size regular fused alumina abrasive but in all other respects the same as above described, were tested against abrasive web wheels of the nature above described, seven inches in diameter also made out of regular fused alumina abrasive of about 36 grit size. The job was grooving armatures for electric machines. The results are shown in Table V which indicates that wheels of the invention have 8.75 times as much life as the abrasive web wheels.

TABLE V

| Wheels | Dia. WW, inches | Pieces Cut |
|---|---|---|
| Invention | ⅛ | 1,500 |
| Abrasive Web | ⅞ | 1,200 |

Further tests were made comparing 36 grid size abrasive wheels according to the invention made as above described in connection with Table V, with non-reinforced wheels, that is having no cloth reinforcement whatsoever, and also with wheels reinforced on the side by glass cloth of plain weave with single ends of warp spaced evenly, 10 ends to the inch which is stated as 10 sley, and 10 picks to the inch. Each pick or weft thread was a single pick and the cloth was open mesh. The same coating of starch above described had been applied followed by impregnation with 30% by weight of the same varnish dried to a volatile of the same 3%. All of these wheels were of the same dimensions 9" x .080" x ⅝". The technical paper was used for the molding of these wheels as this is provided to prevent sticking to the mold. All wheels of this group had the same 36 grid size abrasive and the same phenolic resin bond in the same proportions and all were molded, stripped, stacked with wire screen, pressed, and baked as above described. The weight of the leno weave glass cloth 41 with the five openings per inch before varnishing was 4.97 ounces per square yard and the weight of this 10 pick 10 sley glass cloth before varnishing was 9.80 ounces per square yard.

Table VI gives the impact test and the Olsen test done as above described on the three kinds of wheels, identified as "non-reinforced" where there was no cloth at all in the wheels, as "invention" which is the same as in the other tables, and as "plain weave glass cloth" which defines the wheels having on the sides the 10 pick 10 sley glass cloth just above described.

TABLE VI

| Wheels | Impact Test, Foot Pounds | Olsen Test, Pounds |
|---|---|---|
| Non-reinforced | .15 | 84 |
| Plain Weave Glass Cloth | 1.12 | 1,028 |
| Invention | .74 | 714 |

Table VII is a comparison of the above wheels cutting one half inch diameter cold rolled steel.

TABLE VII

| Wheels | Dia. WW, inches | Average time per Cut, secs. | No. Cuts | Comments |
|---|---|---|---|---|
| Non-reinforced | .070 | .8 | 20 | Medium to heavy burr. No burn. |
| Plain Weave Glass Cloth | .250 | 1.2 | 20 | Heavy burr. Slight burn. |
| Invention | .127 | .7 | 20 | Medium burr. No burn. |

Table VIII is similar to Table VII and compares these wheels cutting ¾ diameter cold rolled steel.

TABLE VIII

| Wheels | Dia. WW, inches | Average time per Cut, secs. | No. Cuts | Comments |
|---|---|---|---|---|
| Non-reinforced | .155 | 1.8 | 10 | Heavy burr. Flash burn. |
| Plain Weave Glass Cloth | .970 | 2.8 | 10 | Heavy burr. Heavy burn. |
| Invention | .280 | 1.7 | 10 | Heavy burr. Flash burn. |

It will be noted from Table VI that the increase of strength by constructing a wheel according to the invention is very great relative to a non-reinforced wheel. While the plain weave glass cloth wheel is still stronger, Table VII shows that it wears away twice as fast as the "invention" wheel and takes longer to cut. Table VIII shows that the plain weave glass cloth wears away almost 3½ times as fast as the invention wheel. Indeed from Table VIII one might prefer the non-reinforced wheel because it shows the lowest wheel wear and there is no difference in time per cut as compared with the invention wheel which is significant. But the invention wheel is five times as strong as the non-reinforced wheel in the impact test and eight and one-half times as strong in the Olsen test. This factor is decisive [because people have been killed by wheels which have broken while running and many people have been injured thereby].

Thus by using open mesh glass cloth as reinforcement on the sides of the wheel in accordance with this invention one can increase the strength many fold (over a non-reinforced wheel) while sacrificing much less in grinding action than if plain weave glass cloth reinforcement were used.

The impregnation of the glass cloth with resin is vital. However, any thermo-setting resin can be used. It should be applied as varnish which means that the resin is dissolved in a suitable solvent for it. In that way the resin, after the volatiles (solvent and volatiles of the resin) have been eliminated to between 1.5% and 10% by weight, which is the range according to the invention, is a viscous liquid. This lubricants the individual fibers of the glass, and prevents them from being crushed during the cold pressing operation.

Typical thermo-setting resins are:

TABLE IX

Phenol-formaldehyde
Aniline-formaldehyde
Melamine-formaldehyde
Epoxy resins
Furane resins
Furfural resins
Glyptals and other polyesters
Vulcanized rubber Any chemist will know suitable solvents for any practical thermo-setting resin. Common solvents which can be used for [all the above] *many thermo-setting resins* are methyl, ethyl and propyl alcohols, including mixtures.

Wheels made according to the invention are superior in all respects pointed out in the objects. The wheels are so strong to side bending that it is practically impossible to break one by bending or even banging it over a straight edge. This is of great importance because many cut-off wheels have flown apart due to side blows.

The organic bond is also, according to the invention, a thermo-setting resin as above defined, examples of which are given in Table IX. In the preferred embodiment of the invention the same kind of resin is used as the bond for the abrasive grit and to impregnate the glass cloth. However, different resins could be used.

Even where the same resin is used as the bond for the abrasive grit and for the impregnation the physical structure of the wheel is different than it would be if the glass cloth had not been impregnated with the resin prior to pressing. This is because application of the resin varnish causes the resin to penetrate into the glass yarn each thread of the warp and weft of which is a multi-filament thread. The only way, however, to describe this physical structure is to state that the glass cloth was, before pressing, impregnated by thermo-setting resin varnish.

It will thus be seen that there has been provided by this invention a cut-off wheel in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. A pressed and cured disc-shaped cut-off wheel comprising abrasive grit bonded with thermo-setting resin bond, said wheel having on each side thereof integrally bonded thereto by said bond a disc of open mesh glass cloth of threads of continuous filament glass yarn in sets of units of warp and weft having a tensile strength of at least 100 lbs. per [unit] *inch width of fabric*, one of the sets of units of warp and weft having at least two threads per unit, said glass cloth having from two and one half to seven openings per inch in the direction of the warp and in the direction of the weft, said discs of glass cloth having before pressing been impregnated with thermo-setting resin varnish with volatiles eliminated to between 1.5% and 10% of said resin varnish by weight, said thermo-setting resin varnish being by weight from 15% to 50% of the total of the glass cloth and thermo-setting resin varnish, each thread of the warp and weft of the glass yarn being a multi-filament thread.

2. A disc-shaped cut-off wheel according to claim 1 in which the resin bond is phenol-formaldehyde resin.

3. A disc-shaped cut-off wheel according to claim 2 in which the open mesh glass cloth discs have a leno weave to form the openings.

4. A disc-shaped cut-off wheel according to claim 1 in which the open mesh glass cloth discs have a leno weave to form the openings.

5. A disc-shaped cut-off wheel according to claim 4 in which the resin varnish is phenol-formaldehyde resin varnish.

6. A disc-shaped cut-off wheel according to claim 1 in which the resin varnish is phenol-formaldehyde resin varnish.

7. A disc-shaped cut-off wheel according to claim 6 in which the resin bond is phenol-formaldehyde resin.

8. A disc-shaped cut-off wheel according to claim 7 in which the open mesh glass cloth discs have a leno weave to form the openings.

References Cited in the file of this patent or the original patent

UNITED STATES PATENTS

| | | |
|---|---|---|
| 2,092,591 | Sohlstrom | Sept. 7, 1937 |
| 2,094,556 | Anderson | Sept. 28, 1937 |
| 2,138,882 | Robie | Dec. 6, 1938 |
| 2,475,517 | Ries, et al. | July 5, 1949 |
| 2,656,654 | Erickson | Oct. 27, 1953 |